Patented Aug. 7, 1923.

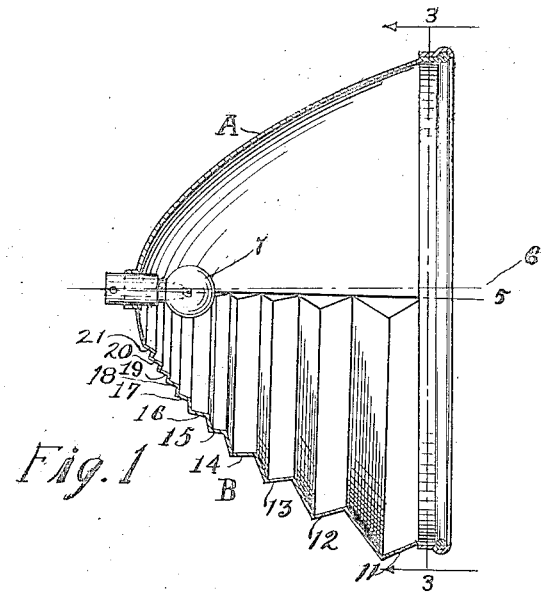
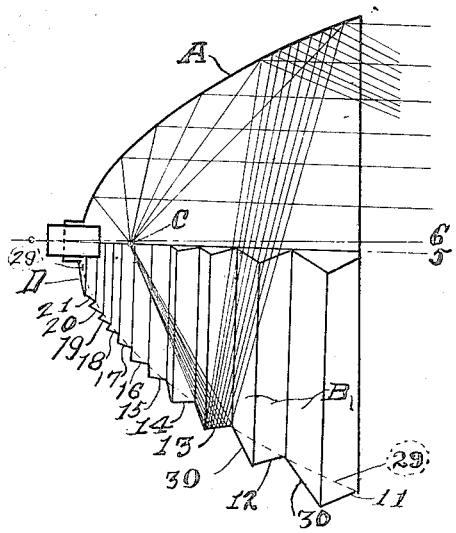
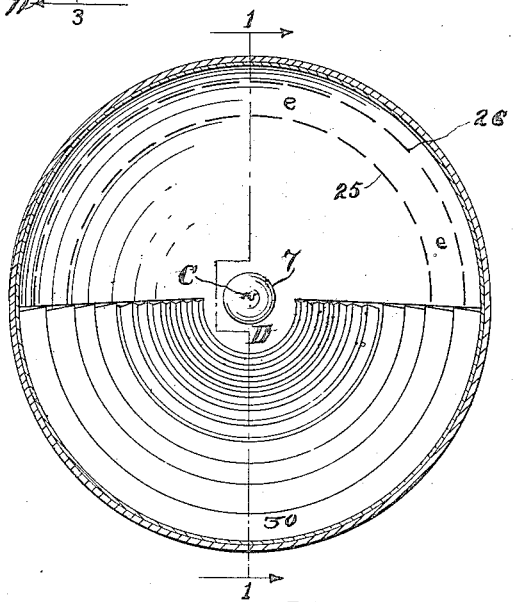

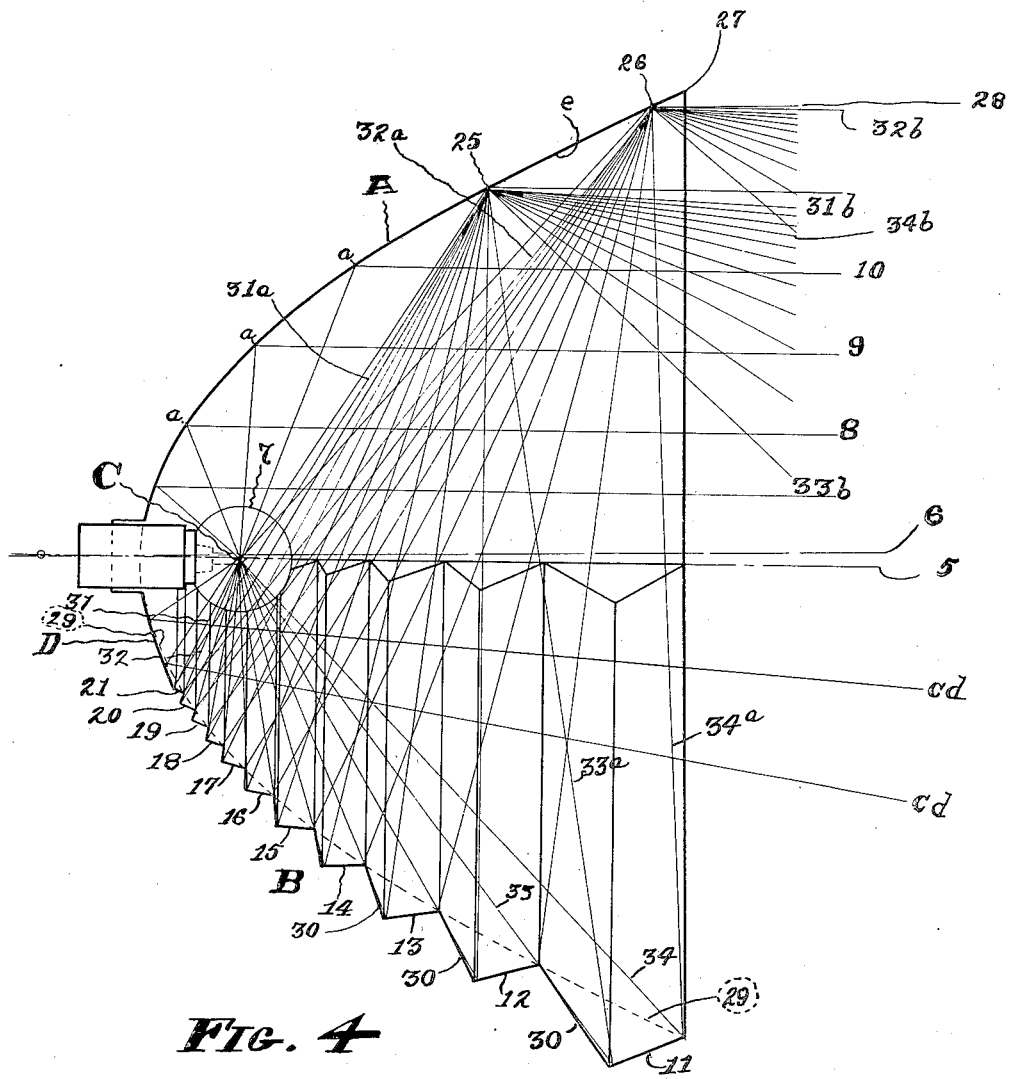

1,464,270

UNITED STATES PATENT OFFICE.

ALPHONSUS R. REMARK, OF AKRON, OHIO.

PROJECTION LAMP.

Application filed September 8, 1920. Serial No. 408,836.

*To all whom it may concern:*

Be it known that I, ALPHONSUS R. RE-MARK, a citizen of the United States, residing at Akron, in the county of Summit and State of Ohio, have invented new and useful Improvements in Projection Lamps, of which the following is a specification.

This invention relates to projection lamps and has particular reference to a projection lamp adapted to be used as a headlight on automobiles, trains and other vehicles or wherever a brilliant concentrated beam of light is necessary or desirable.

The main object of the invention is to provide a non-glaring headlight for automobiles and the like, whereby the roadway may be brilliantly illuminated without producing upward glare, that is, to provide a headlight whereby all the rays emanating from a source of light will be directed forwardly below a sharply defined horizontal plane extending through the source of light.

A further object is to provide a projection lamp of simple, economical construction which, when used as a headlight on a vehicle, will brilliantly illuminate the roadway from a point directly in front of the vehicle to a point far in advance of same and without producing upward glare, so that approaching pedestrians or the occupants of an approaching vehicle will not be blinded or annoyed by rays issuing therefrom.

A still further object is to provide a lamp of the class above indicated which will utilize all of the rays issuing from the source of light and project the same forwardly only where illumination is necessary or desired.

The above and other objects are accomplished by the novel construction, combination and arrangement of parts hereinafter described and illustrated in the accompanying drawings in which I have shown a preferred embodiment of the invention, it being understood that the invention is capable of various adaptations and that changes, variations and modifications may be made or substitutions resorted to which come within the scope of the matter hereinafter claimed.

In the drawings which form a part hereof and wherein I have employed similar numerals of reference to indicate corresponding parts throughout the several views,—

Figure 1 is a central, vertical sectional view of an automobile head light constructed in accordance with this invention and taken as indicated by the line 1—1 of Figure 3.

Figure 2 is a diagrammatic view showing a vertical sectional view of same and having lines drawn thereon to indicate the path taken by rays of light emanating from the light source.

Figure 3 is a front elevation taken partly in vertical section as indicated by the lines 3—3 of Figure 1.

Figure 4 is an enlarged diagrammatic view similar to the view shown in Figure 2 and illustrating with greater particularity the manner of constructing a headlight in accordance with this invention and the manner in which the rays of light will be projected therefrom.

Proceeding now to a detailed description, my improved lamp preferably comprises a reflector which has an upper half constructed in the shape of a hemi-paraboloid denoted by the letter A and a lower half which is provided with a parabolically disposed series of stepped reflecting surfaces denoted by the letter B. The letter C is used to denote the source of light which is located at the focus of the paraboloid A and is also used to indicate said focus. The line indicated by the numeral 5 is used to denote the axis of the lamp and the line indicated by the numeral 6 denotes a horizontal line above the axis 5 which intersects the axis 5 at a point in the directrix of the upper parabolic surface A. The numeral 7 indicates an ordinary light bulb which contains the filament or source of light C. Inasmuch as the upper surface A is constructed in the form of a true hemi-paraboloid and inasmuch as the source of light is at the focus of the lamp, the light rays emitting from the light source C will be reflected thereby so as to issue forwardly in lines parallel to the axis of the lamp. The axis of the lamp 5 is inclined at an angle to the horizontal line 6 and all of the rays reflected from the upper half A of the lamp will be projected forwardly below a horizontal line as shown by the lines $C$ $a^8$, $C$ $a^9$ and $C$ $a^{10}$. The lower half B of the reflector comprises a series of circumferentially directed deflecting surfaces 11, 12, 13, 14, 15, 16, 17, 18, 19, 20, and 21 which are arranged in step form along parabolic lines as shown by the dotted line 29 in Figures 2 and 4. Each of said deflecting surfaces corresponds to a portion of the surface of a cone coaxially arranged in respect to the lamp and each surface is pitched according to its location in the lamp so that rays of light proceeding from the light source at the focus of the lamp will be deflected by said surface to the upper half of the lamp and to that portion of said upper reflecting surface that lies between the lines 25 and 26, so that the rays will be deflected forwardly and downwardly thereby. It will be noted that each of said conic surfaces has its own particular pitch, the pitch being proportionate to the angle of incidence necessary to deflect the rays to the upper reflector and between the lines 25 and 26 thereon, so that all of the rays proceeding from the source of light to the said conic surfaces will be deflected thereby to that portion of the surface of the upper reflector A lying between the said lines 25 and 26 which for the purpose of facilitating this description, I have denoted by the letter e. The width of each of said conic deflecting surfaces depends upon its distance from the source of light and the distance to the reflecting portion a of the upper half A of the lamp and upon the angle of incidence at which said rays strike the reflecting surface e. In the diagram shown in Figure 4, it will be noted that the deflecting surface 21 is the closest to the light source C and that the diverging rays proceeding thereto will follow the natural lines of divergence therefrom and that the width of said surface is such that the said rays will strike the upper surface A on that portion thereof designated by the letter e.

It is obvious that the surface 20 must be relatively wider than the surface 21, inasmuch as it is further from the source of light C and is pitched to cause the light deflected therefrom to strike the surface e at a less acute angle. It is also apparent that for the same reason the step 19 is wider than the step 20 and that each succeeding step increases in width proportionately according to the distance from the light source and to the reflecting portion e. Rays proceeding from the light source C to any one of the conic surfaces will, because of the difference in the angle of incidence, be deflected therefrom in a diverging beam which will be confined to the portion e of the upper half of the lamp A.

For example, light proceeding from the source C and falling upon the extreme inner edge of any one of said conic deflecting surfaces will be deflected to the line 25 on the upper half A and the light falling upon the extreme outer edge of each of said surfaces will be deflected so as to strike the upper portion of the lamp A along the line 26. The numeral 30 is used to denote the connecting walls which are used to connect the successive conic deflecting surfaces. Each of the walls 30 are portions of conic surfaces coaxially arranged in respect to the lamp. Each wall 30 is slightly inclined from a line drawn from the focus to its inner edge so that none of the rays proceeding from the source of light at the focus C can fall upon the surface thereof.

It will be noted that the line 26 is drawn inwardly from and in parallel spaced relation to the outer edge 27 of the upper half A of the lamp and that none of the rays proceeding from the focal point to the lower half of the reflector will be deflected thereby to the portion of the upper half A of the lamp lying between the line 26 and the outer edge of the lamp 27. The portion A is thus spaced inwardly from the outer edge of the lamp and provision is thereby made for the difference in the angle of incidence produced by a relatively large filament and which arrangement also provides for the change of the locus of the light in respect to the focus. It will be noted that the extreme outer edge of each conic deflecting surface is on the parabolic line 29 and that each of said deflecting surfaces diverge therefrom, and that the surface D of the lower half of the lamp is disposed in a curve running from the axis of the lamp to the inner edge of the conic surface 21. It will thus be seen that rays emanating from the source C to the surface D will be deflected forwardly thereby below a horizontal line as illustrated by the line Cd in Figure 4.

In operation, rays produced by the light source C, which is preferably the filament of the light bulb 7, will proceed to the surface 21 in a diverging path indicated by the lines 31 and 32 and be deflected thereby as indicated by the lines 31$^a$ and 32$^a$ to the portion of the upper deflector lying between the lines 25 and 26 which deflects the said rays outwardly below the horizontal line 28 as indicated by the lines 31$^b$ and 32$^b$. Likewise the rays proceeding from the source C to the surface 11 in a path indicated by the lines 33 and 34, are deflected by said surface to the portion e of the upper parabolic surface A as indicated by the lines 33$^a$ and 34$^a$ and the said rays are deflected from the portion e as indicated by the lines 33$^b$ and 34$^b$.

Inasmuch as each of the other surfaces 12, 13, 14, 15, 16, 17, 18, 19 and 20 deflect the rays in a similar manner, it is believed that the above description of the rays proceeding to the surface 21 and to the surface 11 is sufficient for the understanding of them all.

Having thus described my invention what I claim as new and desire to secure by Letters-Patent is:—

In a projection lamp an upper half having a paraboloidal reflecting surface, a source of light at the focus thereof and a lower half comprising a plurality of circumferentially directed, connected, reflecting surfaces arranged in step-like formation, each of which corresponds to a portion of the surface of a cone coaxially arranged in respect to the axis of the lamp; each of said last named reflecting surfaces being of the proper pitch and of the proper width to deflect the rays proceeding thereto from the source of light to a pre-determined area on the upper reflecting surface substantially as and for the purpose herein set forth.

In testimony whereof I have hereunto set my hand.

ALPHONSUS R. REMARK.